UNITED STATES PATENT OFFICE.

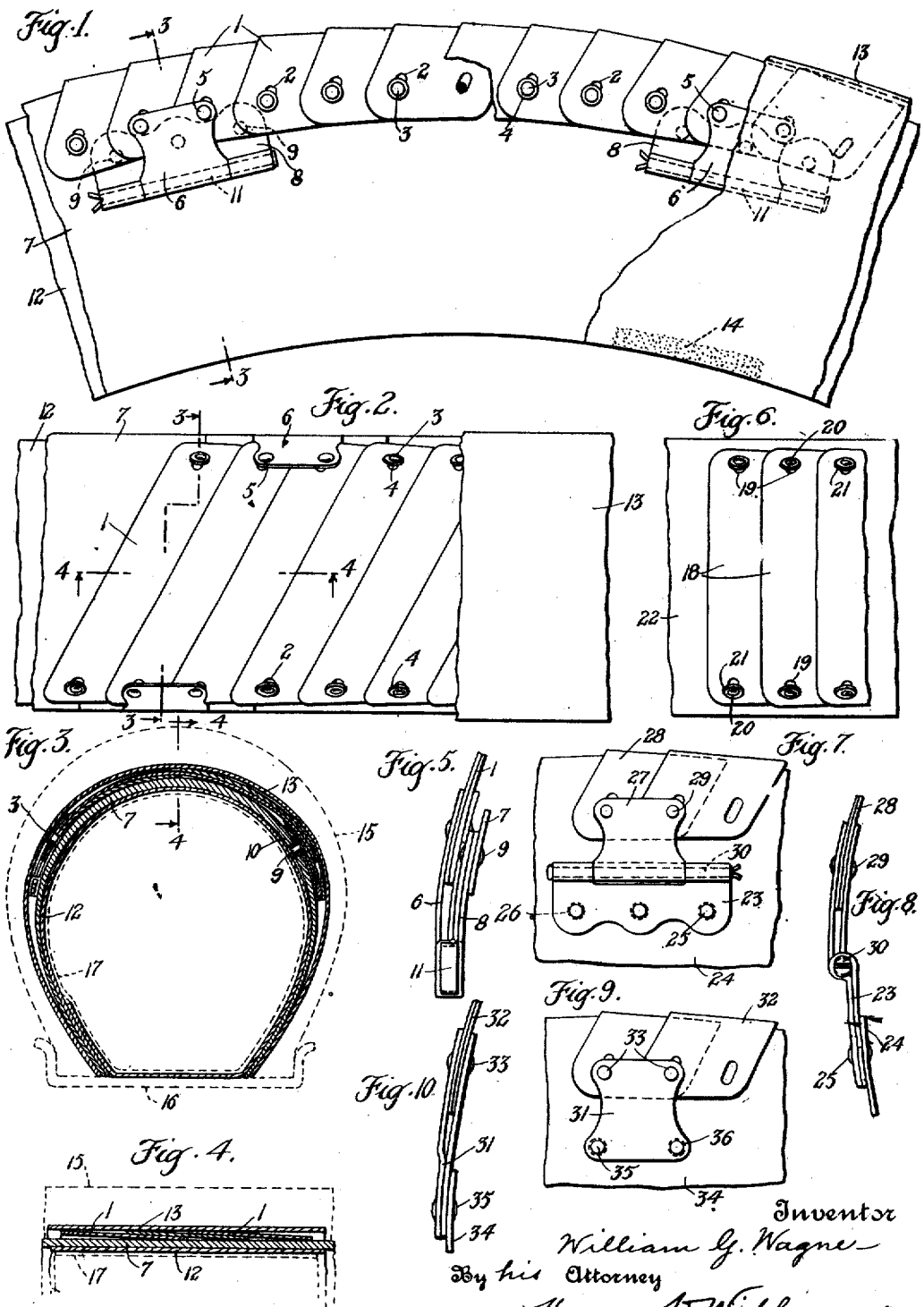

WILLIAM G. WAGNER, OF NEW YORK, N. Y., ASSIGNOR OF ONE-THIRD TO BENJAMIN COHEN AND ONE-THIRD TO HENRY COHEN, BOTH OF NEW YORK, N. Y.

TIRE-ARMOR.

1,241,792.  Specification of Letters Patent.  Patented Oct. 2, 1917.

Application filed January 19, 1917. Serial No. 143,220.

*To all whom it may concern:*

Be it known that I, WILLIAM G. WAGNER, a subject of the Emperor of Germany, residing at the borough of Manhattan, in the county of New York and State of New York, have invented certain new and useful Improvements in Tire-Armors, of which the following is a specification, reference being had therein to the accompanying drawings, forming part thereof.

My invention relates to armor devices for pneumatic tires and relates more particularly to that type of tire armor which is in the form of a removable lining to be applied within the usual outer tire shoe or casing and between the inside of this casing and the usual inner inflatable rubber tire tube.

An object of my invention is to produce an improved and more effective device of this kind than has been heretofore produced, and that will effectively protect the usual inner inflatable rubber tube from punctures and blow-outs, while preserving the pneumatic resiliency of the tire construction. Other objects of my invention are convenience of use, ease of repair or renewal of parts of the armor device, simplicity of construction, inexpensiveness of manufacture and other objects and advantages which will hereinafter appear.

My invention includes a comparatively flexible peripheral protective band detachably secured along its opposite margins to a flexible fabric carrying sheet in such manner that the different joined parts or members of which such band is composed are relatively movable in reference to one another and also with reference to the flexible fabric carrying sheet to which such protective band is attached. My invention further includes features of construction and combinations of parts, as will appear from the following description.

I shall now describe the several tire armor constructions constituting a plurality of embodiments of my invention illustrated in the accompanying drawings and shall thereafter point out my invention in claims.

Figure 1 is a side elevation with parts broken away of a tire armor embodying my invention.

Fig. 2 is a plan view of the construction shown in Fig. 1.

Fig. 3 is a transverse section on slightly offset planes indicated by the line 3—3 of Figs. 1 and 2, as viewed from the left, the wheel rim, the tire casing or shoe and the inflatable inner tire tube being additionally shown in outline by broken lines in this figure.

Fig. 4 is a partial longitudinal section on a plane indicated by the line 4—4 of Figs. 2 and 3, as viewed from below in Fig. 2 and from the left in Fig. 3, the outer shoe and inner tube appearing in outline, similarly to Fig. 3.

Fig. 5 is a partial enlarged end elevation of some of the parts of the armor construction, as viewed from the right in Fig. 1.

Fig. 6 is a plan view similar to Fig. 2 of a slightly modified tire armor construction in which the series of peripherally arranged overlapping armor plates are arranged straight across transversely instead of diagonally as appears in the construction illustrated in Figs. 1 to 5 inclusive.

Fig. 7 is a side elevation similar to Fig. 1, illustrating a modified form of anchor device for holding the armor plates in position upon the sheet of fabric by which they are carried.

Fig. 8 is an end elevation similar to Fig. 5 of the modified construction appearing in Fig. 7.

Fig. 9 is a side elevation similar to Fig. 7 of a further modified construction of the anchor device.

Fig. 10 is an end elevation similar to Figs. 5 and 8 of the construction appearing in Fig. 9.

In the tire armor construction embodying my invention illustrated in Figs. 1 to 5 inclusive of the drawings, thin metallic armor plates 1 of suitable metal, such as steel, are shown as arranged transversely diagonally in a continuous peripheral series in overlapping relation. Each of these thin metallic armor plates 1 in the tire armor construction, illustrated in Figs. 1 to 5 inclusive, is, when in a straightened or flattened condition, of the shape of a rhomboid with rounded corners, as appears in the drawings. Adjacent to each of the four rounded corners, that is to say, in the margin near the opposite end of each such armor plate 1, a slot 2 is provided, there being four such slots 2 in each plate 1, these slots 2 extending longitudinally of the armor plate 1 parallel to its side edges, and therefore the slots 2 extend similarly diagonally to the tire armor construction, as appears in the drawings, particularly in Figs. 1 and 2 thereof. Adjacent armor plates 1 are secured together for limited relative movement longitudinally of these plates by means of plate-connecting rivets 3 which pass loosely through the registering slots 2 in the adjacent margins of two adjacent overlapped plates 1, these rivets 3 having flattened inner heads and being shown as provided with outer washers 4. Also the rivets 3 have slight movement transversely of the slots 2, as appears in Fig. 1 at the rivet 3 there appearing in section. This transverse movement is to provide for a proper amount of contraction and expansion peripherally of the tire.

At suitable spaced intervals peripherally of the tire armor the connecting rivets 3 are replaced by longer combined plate-connecting and plate-securing rivets 5 which pass not only through the registering slots 2 in the overlapped armor plates 1 but also pass through inner and outer leaf parts of a sheet metal anchor member 6 which is the outer member of a two-part anchoring device, so that the rivets 5 serve the double purpose of connecting together adjacent overlapped armor plates 1 and for connecting the outer member 6 of the anchor to these plates 1. The two leaves or thicknesses of the outer anchor member 6 are disposed respectively at the inside and at the outside of the continuous series of overlapped armor plates 1, as shown in the drawings, in Figs. 3 and 5 thereof. The opposite ends of two adjacent plates 1 are shown in the drawings as thus connected to corresponding anchor members 6 by means of the rivets 5, which pass loosely through the alined slots in the plates 1, similarly in this respect to the connecting rivets 3. It will now be understood that all of the peripherally arranged overlapped armor plates 1 are connected together for a limited amount of movement relatively to each other and also for a similar limited amount of movement relatively to the anchor members 6 of those plates 1 which are connected thereto by means of the rivets 5. The peripheral plates 1 are arranged in a continuous circular series of which only a limited number of the plates appears in the drawings, these connected plates 1 forming a continuous or annular peripheral protective band.

A circularly continuous or annular carrying sheet 7 is provided for the endless or annular peripheral band formed by the connected armor plates 1. This carrying sheet 7 is composed of suitable flexible fabric, for example, rubberized canvas, and may be what is known as three-ply fabric, so as to be of suitable thickness and strength. The outer anchor members 6, secured, as above described, to the peripheral armor band, are detachably connected to the carrying sheet 7. Inner anchor members 8 are fixedly or rigidly secured to the outer side of the flexible fabric carrying sheet 7 by means of rivets 9, shown as passing through eyelets 10 in the sheet 7, these securing rivets 9 being shown as three in number for each anchor member 8. The outer anchor member 6 is detachably secured to the inner anchor member 8 by means of a removable anchor pin or connecting pin 11 around which the sheet metal anchor members 6 and 8 are folded, so that the inner anchor member 8 as well as the outer member 6 comprises two leaves or two thicknesses of metal, these two thicknesses of the inner anchor member 8 lying in contact with each other and being together secured to the flexible fabric carrying sheet 7 by means of the rivets 9 which pass through both such leaves or thicknesses.

The anchor pin 11 which detachably connects together the outer anchor member 6 and the inner anchor member 8 is shown as of flattened cross-section, as appears in the drawings, particularly in Figs. 3 and 5 thereof, and the sheet metal forming the inner and outer anchor members is shown as folded closely around and in contact with the flat sides of the anchor pin 11, this flattened construction of the anchor pin being preferred because of the fact that it occupies less space as to thickness while providing adequate strength. Also it has been found preferable to hold the outer anchor members 6 rigidly in place without the possibility of pivotal action on the inner anchor members 8. The flat anchor pin 11 is shown as slightly wider at one end to provide projecting shoulders which form a pin-retaining head, while the other end of the removable anchor pin 11 is shown as of bifurcated or split construction, so that it may be spread, similar in this respect to an ordinary cotter pin, for removably retaining the anchor pin 11 in place, as clearly appears in the drawings. Any other suitable means for retaining the anchor pins in place may be employed.

It will be evident that any anchor pin 11 may be at any time removed merely by pressing together the spread prongs of its bifurcated or split end. The ready disconnection of the outer anchor member 6 from the inner anchor member 8 by means of the removable and reinsertible anchor pin 11 provides for the convenient renewal of any of the thin sheet metal armor plates 1, by first disconnecting the peripheral protective band formed by these plates 1 from the flexible fabric carrying sheet 7, and in fact this entire continuous peripheral protective band may be thus disconnected and removed as a whole from the correspondingly annular carrying sheet 7 if desired, and when the required repairs have been made to this protective band then it may be replaced upon the carrying sheet 7, the anchor pins 11 then being reinserted.

The anchor devices, such as above described, maintain the protective armor band, made up of the loosely connected overlapping armor plates 1, in proper place transversely upon the periphery of the annular flexible fabric carrying sheet 7, and thereby this protective band is kept in proper place relatively to the tire as a whole, which may include a usual outer shoe and a usual inflatable inner tube which is protected by the protective band. However, it is to be noted that the armor plates 1 have considerable freedom of movement, being attached only to each other between the spaced anchor devices, and the pairs of plates which are supported at their opposite ends by the anchor devices being permitted to move relatively to the anchor devices, as hereinbefore described. These anchor devices may be circumferentially spaced from one another as desired or as may be required in any particular instance, for example, from six inches up to a foot apart, and ordinarily about eight of these anchor devices would be employed around the complete circumference of the annular tire armor.

The thin metallic peripherally overlapping armor plates 1, forming the complete annular protective band, are preferably located, as shown in the drawings, upon the outer side or outer peripheral surface of the flexible fabric carrying sheet 7 and the armor plates 1, together with the anchor devices, are shown as extending somewhat less than half way down along the side of the split annular tube formed by the flexible carrying sheet 7, which is to that extent correspondingly wider than the protective band formed by the plates 1, as most clearly appears perhaps in Figs. 1 and 3.

The carrying sheet 7 is provided with a flexible lining sheet 12 which may consist of suitable material, thinner and lighter than the carrying sheet 7, for example, two-ply rubberized fabric. One marginal edge of the lining sheet 12 is suitably secured, such as by vulcanizing, cementing or otherwise, to the adjacent margin of the inside of the carrying sheet 7 and the remainder of the lining sheet 12 may be free or unattached to the inner surface of the carrying sheet 7, and this lining sheet 12 extends completely around and has a free marginal edge overlapping upon itself, as is clearly shown in Fig. 3. One of the functions of this lining 12 is to protect the usual inner inflatable rubber tire tube from abrasion by the heads of the rivets 9, by which the inner the anchor members 8 are rigidly secured to the outer side of the carrying sheet 7, as hereinbefore described.

The flexible carrying sheet 7 is also provided with a cover sheet 13 for the armor plates 1 and their metallic adjuncts, such as the hereinbefore described anchor devices, and this cover sheet also may be formed from two-ply rubberized fabric, similar to the lining sheet 12. At one of its margins the cover sheet 13 is firmly secured, such as by vulcanizing or cementing, to the contiguous margin of the carrying sheet 7, and this cover sheet 13 may extend freely or loosely around at the outside of the metallic armor plates 1 and at its other marginal edge is preferably secured in place by cement at intervals to the outside of the carrying sheet 7, as is indicated at 14 in Fig. 1. These cemented spots 14 may each be three or four inches in length and may be spaced apart a foot or so. The cementing of one of the margins of the cover sheet 13 to the outside of the contiguous margin of the carrying sheet 7 at spots, such as indicated at 14, provides for the convenient pulling loose or detachment of this edge of the cover sheet 13 from the underlying carrying sheet 7, so as to provide ready access to the underlying anchor plates 1 and the hereinbefore described two-part disconnectible anchor devices, so that repairs, as hereinbefore mentioned, may be readily effected to any of the thin metallic armor plates 1, which may have become damaged, for example, by reason of some accident. The cover sheet 13 may be, as is shown in the drawings, of the same width or transversely coterminous with the carrying sheet 7. The function of the cover sheet 13 is to protect the inner surface of the usual outer shoe or tire casing from abrasion or wear which might be caused by the metallic armor plates 1 and the other metallic parts combined therewith.

In Figs. 3 and 4, hereinbefore referred to, the complete annular tire armor of my invention is shown in its position of use as installed as a lining within a usual or common form of tire shoe or casing 15 which is mounted upon a usual or common form of wheel rim 16, and with a usual inflatable rubber inner tire tube 17 shown as contained within the armored lining for the shoe 15 which is provided by the hereinbefore described tire armor of my invention, the tire tube 15, the wheel rim 16 and inner tube 17 being shown in the drawings only in outline by means of broken lines, it being understood that these parts may be of a usual or of any suitable construction and that they form no part of my present invention, which is embodied in a separate article which forms a continuous annular removable protective lining at the inner side of the shoe 15 and at the outside of the usual inner tire tube 17. The carrying sheet 7 and the overlying covering sheet 13 as to their width are made substantially coterminous with the tire shoe 15 and at their edges similarly abut against the wheel rim 16, as clearly appears in Fig. 3.

In this connection it is to be noted that the free partly overlapping marginal part of the inner lining sheet 12 forms a covering for the outer or peripheral surface of the wheel rim 16, being disposed, as clearly appears in Fig. 3, between the adjacent surface of the inner tire tube 17 and the outer surface of the wheel rim 16, and thus effectually serves to protect the inner rubber tire tube 17 from abrasion or from any rust which may accumulate upon the wheel rim 16. It has heretofore been common to provide a separate outer band or cover of rubber for metallic wheel rims for the purpose of thereby keeping them from contact with the inner tube and such an outer band for the wheel rim 16 may now, in the use of the tire armor of my invention, be dispensed with as unnecessary and the expense thereof accordingly saved.

Should there be a blow-out of the inner tube 17, such, for example, as might occur from some defect therein, then the flexible fabric carrying sheet 7, lining sheet 12 and cover sheet 13 will fold along a substantially medial line below the anchor devices, thereby permitting the shoe 15 and its inner tube 17 to flatten against the wheel rim 16 in the usual manner, as is well understood, the thin metallic armor plates 1 then straightening out until they may be substantially flat, these plates 1, however, again resuming the proper transverse curve when repairs have been effected and the tire inflated. The thinness of the flexible armor plates 1 together with their arrangement and relative mobility results in the pneumatic tire upon which the tire armor of my invention may be employed, retaining substantially its usual resiliency while effective protection is provided for the usual inner tire tube 17, both from punctures and from any likelihood of a blow-out due to accidents to or the wearing away of the usual outer shoe 15. The thickness of the several parts, particularly of the armor plates 1 and of the flexible fabric sheets 7, 12 and 13 has been considerably exaggerated in the drawings, for purposes of illustration.

The modified form of tire armor embodying my invention illustrated in Fig. 6 of the drawings differs from that hereinbefore described and illustrated in Figs. 1 to 5 inclusive in that the thin metallic armor plates 18 illustrated in Fig. 6 are, when flattened out, of substantially rectangular form with rounded corners and extend straight across at right angles to the line of tread, instead of diagonally as in the hereinbefore described construction. In this modified construction illustrated in Fig. 6 the slots 19 in the armor plates 18 also extend crosswise of the device parallel with the marginal edges of the plates 18, as appears in this figure of the drawings. The thin metallic armor plates 18 overlap in a manner similar to the diagonal plates 1 and are secured together for limited relative movement by means of rivets 20 passing loosely through the alined slots 19 and provided with outer washers 21, similar to the rivets 3, in the hereinbefore described construction. A carrying sheet 22 is provided, similar to the flexible fabric carrying sheet 7 hereinbefore described, and in other respects than above noted the modified construction illustrated in Fig. 6 may be the same as hereinbefore described in reference to Figs. 1 to 5 inclusive.

A modified form of anchor device is illustrated in Figs. 7 and 8 in which a lower anchor member 23 is rigidly secured to an underlying carrying sheet 24 by means of rivets 25 which may pass through eyelets 26 provided in the flexible fabric carrying sheet 24, as is indicated in broken lines in Fig. 7. An upper anchor member 27 is movably secured to the adjacent ends of two metallic armor plates 28 by means of rivets 29 similar to the rivets 5 hereinbefore described in reference to the anchor plates 1 and outer anchor members 6 illustrated in Figs. 1 to 5 inclusive. The upper anchor member 27 is detachably connected to the lower anchor member 23 by means of a round wire or cylindrical pintle pin 30 which also forms a hinged connection between the anchor members 23 and 27. It should be noted that the lower anchor member 23 is reversed in position as compared with the inner anchor members 8, illustrated in Figs. 1 to 5 inclusive, so that in the construction illustrated in Figs. 7 and 8 the lower anchor member 23 extends farther radially inward along the side of the flexible carrying sheet 24 and forms a hinge with the upper anchor member 27. In other respects than noted, the construction illustrated in Figs. 7 and 8 may be the same as that illustrated and described in reference to Figs. 1 to 5 inclusive, or as illustrated and described in reference to Fig. 6, if so desired. In case of a flat tire, the cylindrical pintle pin 30, which forms a hinge pivot between the anchor members 23 and 27, permits these anchor members to fold relatively to each other as the tire flattens. However, in this connection it is to be noted that if desired, the lower anchor member 23 may be so connected to the upper anchor member 27 by the removable pintle pin 30 that the upper anchor member 27 will overlie the lower anchor member 23, and the construction in this respect will then resemble that illustrated in Figs. 1 to 5 inclusive, and the operation would then be similar, the folding of the carrying fabric 24 and of the other fabric parts and of the tire parts then taking place below the line of both anchor members 23 and 27, as will be clear from Fig. 1 of the first described construction.

In Figs. 9 and 10 a somewhat simplified embodiment of my invention is illustrated in which the anchor devices, instead of each comprising two readily disconnectible parts, are each composed of a single anchor member 31 to which the overlapped armor plates 32 are secured for limited movement by means of rivets 33, the anchor 31 being shown as comprising inner and outer thicknesses or leaves, similar in this respect and in their attachment to the armor plates 32 to the constructions hereinbefore described. The anchor 31, illustrated in Figs. 9 and 10, is rigidly secured directly to an underlying carrying sheet 34 for the armor plates 32 by means of rivets 35 passing through eyelets 36 in the carrying sheet 34, as is indicated in broken lines in Fig. 9. It will be noted that this modified construction of anchor 31 does not provide for the ready detachability of the armor plates 32 from the flexible fabric carrying sheet 34, and it would be necessary to clip the rivets in order to effect such detachment. However, this simpler construction might be desirable in some instances. In other respects than as noted, the construction of tire armor illustrated in Figs. 9 and 10 may be the same as described in reference to Figs. 1 to 5 inclusive, or like that described in reference to Fig. 6, if so desired.

It is obvious that various modifications may be made in the constructions shown in the drawings and above particularly described within the principle and scope of my invention.

I claim:

1. A tire armor comprising a peripheral protective band, a flexible carrying sheet therefor, and means for movably anchoring the protective band to the carrying sheet at spaced intervals along the edges of the protective band.

2. A tire armor comprising a plurality of metallic armor members secured together for relative movement and forming a peripheral protective band, a flexible carrying sheet for said band, and devices anchoring the opposite edges of said protective band to the carrying sheet, said anchor devices being spaced apart a distance greater than the dimensions of said metallic armor members along lines between said anchor devices, whereby some of said armor members between said anchor devices will not be directly attached to said anchor devices.

3. A tire armor comprising a plurality of metallic armor members joined together for relative movement and forming a peripheral protective band, a flexible carrying sheet for protective band, and anchor devices connecting some of said metallic members to the carrying sheet for movement of said members relatively to said sheet, others of said metallic members being unconnected to said sheet.

4. A tire armor comprising a plurality of metallic armor members joined together for relative movement and forming a peripheral protective band, a flexible carrying sheet for said protective band, and anchor devices along the opposite edges of said band spaced a greater distance apart than the dimensions of said armor members along lines joining the successive anchor devices and movably connecting some of said armor members along the opposite edges of said band to said carrying sheet, others of said armor members being unconnected to said sheet.

5. A tire armor comprising a plurality of metallic armor members movably secured together to form a peripheral protective band, a flexible carrying sheet for said band, and circumferentially spaced anchor devices detachably securing the opposite edges of said protective band to the carrying sheet at distances apart greater than the dimensions of said band-forming members between said anchor devices.

6. A tire armor comprising thin overlapping metallic armor plates extending transversely and joined together for relative movement to form a peripheral protective band of which the overlapped plates extend from edge to edge, a flexible carrying sheet for said protective band, and anchor devices movably attaching some of said armor plates to said carrying sheet, others of said armor plates between said anchor devices being unattached to said carrying sheet, whereby said armor plates are movable relatively to each other and are also movable relatively to said carrying sheet.

7. A tire armor comprising a peripheral series of transversely extending peripherally overlapping thin metallic armor plates having therein a plurality of slotted openings extending longitudinally of the overlapping marginal edges of each of these plates, fastening devices securing the adjacent plates together through said slotted openings for relative movement of the armor plates, such movably connected armor plates forming a peripheral protective band, a flexible carrying sheet for said peripheral protective band, and anchor devices fixedly secured to said carrying sheet and movably secured to some of said armor plates by means of some of said fastening devices, others of said armor plates between said anchor devices being unattached to said anchor devices.

8. A tire armor comprising a series of thin metallic transversely extending peripherally overlapping armor plates forming a peripheral protective band, the overlapped margins of said plates having longitudinal registering slots therein, fastening devices passing through and having movement in said slots for movably securing the said overlapped armor plates together, a flexible carrying sheet for said peripheral protective band, and anchor devices along the opposite marginal edges of said protective band fixedly secured to said carrying sheet and movably secured to some of said armor plates by means of some of said fastening devices, said anchor devices being in spaced relation and a plurality of said armor plates between said anchor devices being unattached thereto.

9. A tire armor comprising a series of thin metallic transversely extending peripherally overlapping armor plates forming a peripheral protective band, the overlapped margins of said plates having longitudinal registering slots therein, fastening devices passing through and having movement in said slots for movably securing the said overlapped armor plates together, a flexible carrying sheet for said peripheral protective band, and anchor devices along the opposite marginal edges of said protective band fixedly secured to said carrying sheet and movably secured to some of said armor plates by means of some of said fastening devices, said anchor devices being in spaced relation and a plurality of said armor plates between said anchor devices being unattached thereto, each of said spaced anchor devices having separable parts disconnectibly connected together, whereby said peripheral protective sheet may be removed from and reattached to said flexible carrying sheet.

10. A tire armor comprising a series of thin metallic transversely extending peripherally overlapping armor plates forming a peripheral protective band, the overlapped margins of said plates having longitudinal registering slots therein, fastening devices passing through and having movement in said slots for movably securing said overlapped armor plates together, a flexible carrying sheet for said peripheral protective band, and anchor devices along the opposite marginal edges of said protective band fixedly secured to said carrying sheet and movably secured to some of said armor plates by means of some of said fastening devices, said anchor devices being in spaced relation and a plurality of said armor plates between said anchor devices being unattached thereto, each of said anchor devices comprising separable members, and a removable anchor pin connecting said members together.

11. A tire armor comprising a series of thin metallic transversely extending peripherally overlapping armor plates joined together to form a peripheral protective band, the overlapped margins of said armor plates adjacent to the ends of said plates being provided with registering slots extending longitudinally of said plates, fastening devices passing through said slots and movable therein for securing together said armor plates and permitting limited relative movement thereof, a flexible carrying sheet for said protective band, and peripherally spaced anchor devices secured to said carrying sheet and also secured to the opposite ends of some of said transversely extending armor plates by means of some of said fastening devices so as to permit limited movement of the armor plates relatively to the anchor devices, others of said armor plates between said anchor devices having no attachment to said anchor devices or to the carrying sheet but only to the adjacent armor plates by means of said fastening devices.

12. A tire armor comprising a series of thin metallic transversely extending peripherally overlapping armor plates joined together to form a peripheral protective band, the overlapped margins of said armor plates adjacent to the ends of said plates being provided with registering slots extending longitudinally of said plates, fastening devices passing through said slots and movable therein for securing together said armor plates and permitting limited relative movement thereof, a flexible carrying sheet for said protective band, and peripherally spaced anchor devices secured to the carrying sheet and also secured to the opposite ends of a plurality of the adjacent armor plates by means of some of said fastening devices for permitting limited movement of said plates relatively to said anchor devices, others of said armor plates between said anchor devices being attached only to adjacent armor plates.

13. A tire armor comprising a series of thin metallic transversely extending peripherally overlapping armor plates joined together to form a peripheral protective band, the overlapped margins of said armor plates adjacent to the ends of said plates being provided with registering slots extending longitudinally of said plates, fastening devices passing through said slots and movable therein for securing together said armor plates and permitting limited relative movement thereof, a flexible carrying sheet for said protective band, peripherally spaced anchor devices secured to said carrying sheet and also secured to the opposite ends of some of said transversely extending armor plates, others of said armor plates between said anchor devices having no attachment to said anchor devices or to the carrying sheet but only to the adjacent armor plates by means of said fastening devices, each of said anchor devices comprising a lower member extending between the ends of said armor plates and said carrying sheet and fixedly secured to the latter, an outer member movably attached by means of some of said fastening devices to some of said armor plates, and a removable flat pin detachably connecting together said anchor members.

14. A tire armor comprising a series of thin metallic transversely extending peripherally overlapping armor plates joined together to form a peripheral protective band, the overlapped margins of said armor plates adjacent to the ends of said plates being provided with registering slots extending longitudinally of said plates, fastening devices passing through said slots and movable therein for securing together said armor plates and permitting limited relative movement thereof, a flexible carrying sheet for said protective band, peripherally spaced anchor devices secured to said carrying sheet and also secured to the opposite ends of some of said transversely extending armor plates by means of some of said fastening devices so as to permit limited movement of the armor plates relatively to the anchor devices, others of said armor plates between said anchor devices having no attachment to said anchor devices or to the carrying sheet but only to the adjacent armor plates by means of said fastening devices, each of said anchor devices comprising superposed inner and outer members and a removable anchor pin for connecting together these anchor members, said anchor pin being flat and the anchor members being folded around it, the outer anchor member having two leaves, one at each side of the end portions of said overlapping armor plates and the inner anchor member having two overlying leaves; and fastening devices fixedly securing the two overlying leaves of said inner anchor member to said carrying sheet.

15. A tire armor comprising a series of thin metallic transversely extending peripherally overlapping armor plates joined together to form a peripheral protective band, the overlapped margins of said armor plates adjacent to the ends of said plates being provided with registering slots extending longitudinally of said plates, fastening devices passing through said slots and movable therein for securing together said armor plates and permitting limited relative movement thereof, a flexible carrying sheet for said protective band, peripherally spaced anchor devices secured to said carrying sheet and also secured to the opposite ends of some of said transversely extending armor plates by means of some of said fastening devices so as to permit limited movement of the armor plates relatively to the anchor devices, others of said armor plates between said anchor devices having no attachment to said anchor devices or to the carrying sheet but only to the adjacent armor plates by means of said fastening devices, said overlapped armor plates being arranged diagonally on said carrying sheet to form said protective band.

16. A tire armor comprising a series of thin metallic transversely extending peripherally overlapping armor plates joined together to form a peripheral protective band, the overlapped margins of said armor plates adjacent to the ends of said plates being provided with registering slots extending longitudinally of said plates, fastening devices passing through said slots and movable therein for securing together said armor plates and permitting limited relative movement thereof, a flexible carrying sheet at the inner side of and of greater width than said protective band, peripherally spaced anchor devices secured to said carrying sheet and also secured to the opposite ends of some of said transversely extending armor plates by means of some of said fastening devices so as to permit limited movement of the armor plates relatively to the anchor devices, others of said armor plates between said anchor devices having no attachment to said anchor devices or to the carrying sheet but only to the adjacent armor plates by means of said fastening devices, and a covering sheet attached to the carrying sheet and overlying said armor plates and anchor devices.

17. A tire armor comprising a series of thin metallic transversely extending peripherally overlapping armor plates joined together to form a peripheral protective band, the overlapped margins of said armor plates adjacent to the ends of said plates being provided with registering slots extending longitudinally of said plates, fastening devices passing through said slots and movable therein for securing together said armor plates and permitting limited relative movement thereof, a flexible carrying sheet at the inner side of and of greater width than said protective band, peripherally spaced anchor devices secured to the opposite ends of some of said transversely extending armor plates by means of some of said fastening devices so as to permit limited movement of the armor plates relatively to the anchor devices, others of said armor plates between said anchor devices having no attachment to said anchor devices or to the carrying sheet but only to the adjacent armor plates by means of said fastening devices, anchor-securing fastening devices passing through said carrying sheet and fixedly securing said anchor devices thereto, a cover sheet secured to said carrying sheet and extending at the outside of said armor plates and anchor devices, and a lining sheet secured at the inner side of said carrying sheet and extending at the inside thereof and at the inside of said anchor-securing fastening devices.

18. A tire armor comprising a series of thin metallic transversely extending peripherally overlapping armor plates joined together to form a peripheral protective band, the overlapped margins of said armor plates adjacent to the ends of said plates being provided with registering slots extending longitudinally of said plates, fastening devices passing through said slots and movable therein for securing together said armor plates and for permitting limited relative movement thereof, a flexible carrying sheet at the inner side of and of greater width than said protective band, means for detachably anchoring the ends of some of said armor plates to said carrying sheet for limited movement relatively thereto, and a cover sheet for said armor plates and anchoring means attached at its opposite edges to said carrying sheet, said cover sheet at one of its edges being detachable from the carrying sheet for giving access to said armor plates and anchoring means.

19. A tire armor comprising a series of thin metallic transversely extending peripherally overlapping armor plates joined together to form a peripheral protective band, the overlapped margins of said armor plates adjacent to the ends of said plates being provided with registering slots extending longitudinally of said plates, fastening devices passing through said slots and movable therein for securing together said armor plates and for permitting limited relative movement thereof, a flexible carrying sheet at the inner side of and of greater width than said protective band, anchor devices to which the ends of some of said armor plates are movably attached, anchor-securing fastening devices for said anchor devices extending through to the inner side of said carrying sheet, a cover sheet for said anchor plates and anchor devices attached at its opposite edges to said carrying sheet, said cover sheet at one of its edges being detachable from the carrying sheet for giving access to said armor plates and anchor devices, and a lining sheet for the carrying sheet secured at one of its edges only to the inner side of the carrying sheet and extending at the inner side of the carrying sheet and at the inner side of said anchor-securing fastening devices and having a free unattached edge overlapped upon itself.

20. A tire armor comprising a series of thin metallic transversely extending peripherally overlapping armor plates, means for connecting the margin of each such plate to the adjacent margin of its neighbor for limited relative movement between the plates and forming a peripheral protective band, a flexible carrying sheet for said protective band, and means for anchoring some of said armor plates to said carrying sheet for limited movement relatively thereto, the remainder of said armor plates being unconnected to said carrying sheet.

21. A tire armor comprising a series of thin metallic transversely extending peripherally overlapping armor plates, fastening devices movably connecting together the overlapped margins of the armor plates at the opposite ends thereof for limited relative movement, a flexible carrying sheet at the inner side of said armor plates, and anchor devices movably anchoring the ends of some of said armor plates to said carrying sheet for limited relative movement, the remainder of said armor plates being unconnected to said carrying sheet.

22. A tire armor comprising a series of thin metallic transversely extending peripherally overlapping armor plates, fastening devices movably connecting together the overlapped margins of the armor plates at the opposite ends thereof for limited relative movement, a flexible carrying sheet at the inner side of said armor plates, and means for detachably anchoring the ends of some of said armor plates to said carrying sheet for limited movement relatively thereto, the remainder of said armor plates being unconnected to said carrying sheet.

In testimony whereof I have affixed my signature.

WILLIAM G. WAGNER.

Copies of this patent may be obtained for five cents each, by addressing the "Commissioner of Patents, Washington, D. C."